US005557686A

United States Patent [19]
Brown et al.

[11] Patent Number: 5,557,686
[45] Date of Patent: Sep. 17, 1996

[54] METHOD AND APPARATUS FOR VERIFICATION OF A COMPUTER USER'S IDENTIFICATION, BASED ON KEYSTROKE CHARACTERISTICS

[75] Inventors: Marcus E. Brown, Tuscaloosa, Ala.; Samuel J. Rogers, Breckenridge, Tex.

[73] Assignee: University of Alabama, Tuscaloosa, Ala.

[21] Appl. No.: 4,135

[22] Filed: Jan. 13, 1993

[51] Int. Cl.$^6$ .................................................. G06K 9/62
[52] U.S. Cl. .................... 382/115; 382/157; 382/159; 382/209; 340/825.31; 340/825.34
[58] Field of Search .................... 382/2, 30, 14, 382/15, 115, 209, 156, 159, 157, 160; 340/825.31, 825.34; 395/22, 23

[56] References Cited

U.S. PATENT DOCUMENTS

| | | | |
|---|---|---|---|
| 4,410,957 | 10/1983 | Cason et al. | 364/900 |
| 4,621,334 | 11/1986 | Garcia | 364/550 |
| 4,805,222 | 2/1989 | Young et al. | 382/2 |
| 4,937,778 | 6/1990 | Wolf et al. | 364/900 |
| 4,962,530 | 10/1990 | Cairns | 380/23 |
| 4,998,279 | 3/1991 | Weiss | 380/23 |
| 5,040,134 | 8/1991 | Park | 364/602 |
| 5,048,100 | 9/1991 | Kuperstein | 382/15 |
| 5,056,141 | 10/1991 | Dyke | 380/25 |
| 5,113,483 | 5/1992 | Keeler et al. | 395/23 |
| 5,131,054 | 7/1992 | Smith | 382/27 |

OTHER PUBLICATIONS de Bruyue et al. "Password-Plus, Authentication Using Dynamic Features" *Scientia Electrica* vol. 36 No. 2 pp. 1–19.

Bleha et al, "Dimensionality Reduction and Feature Extraction Applications in Identifying Computer Users" IEEE Trans on Syst., Man and Cybern, vol. 21 Iss:2 pp. 452–456 1991.

Bleha et al. "Computer Users Verification Using the Perceptron Algorithm" IEEE Trans. on Syst., Man and Cybern. vol. 23, No. 3, 1993.

Obaidat et al. "An Intelligent Neural Network System for Identifying Computer Users". Proceedings of ANNIE '91, pp. 953–959, Nov. 1991.

Kohonen. "The Self-Organizing Map." Proceedings of the IEEE. vol. 78, No. 9, pp. 1464–1480, Sep. 1990.

Dynamic Identity Verification Via Keystroke Characteristics; John Leggett, Glen Williams and Mark Usnick; Int. J. Man-Machine Studies (1991), pp. 859–870, 35; Texas A&M Univ. College Station, Texas.

(List continued on next page.)

*Primary Examiner*—Joseph Mancuso
*Assistant Examiner*—Jon Chang
*Attorney, Agent, or Firm*—Oblon, Spivak, McClelland, Maier, & Neustadt, P.C.

[57] ABSTRACT

A method and apparatus for determining whether a user of a system is an authorized user or an imposter by examining the keystroke characteristics of the user. The authorized user initially enters a number of user training samples on a keyboard. The user training samples are then purified to eliminate training samples which are different from other training samples. The purification can be performed by a self-organizing neural network which has input thereto, authorized user training samples, or both authorized training samples and imposter training samples. The purified user training samples are then compared to a sample to be tested to determine whether the sample is from an authorized user or an imposter. The comparison of the purified samples with the sample to be tested can be performed by a neural network such as a back propagation trained network, an ADALINE unit, a distance method or a linear classifier, discriminate function, or piecewise linear classifier. The result of this testing step indicates whether the user is authorized or an imposter and the user can be granted or denied access to the system.

51 Claims, 11 Drawing Sheets

OTHER PUBLICATIONS

Verifying Identity Via Keystroke Characteristics; John Leggett and Glen Williams; Int. J. Man–Machine Studies (1988), pp. 67–76, 28 Department of Computer Science, Texas A&M Univ., Texas.

Personal Attributes Authentication Techniques; Rome Air Development Center, Griffins Air Force Base, NY; RADC–TR–77–333 Final Technical Report, Oct. 1977, AD A047645.

The Keystroke–Level Model For User Performance Time With Interactive Systems; Stuart K. Card and Thomas P. Moran, Xerox Palo Alto Research Center, Allen Newell, Carnegie–Mellon Univ., Jul. 1980, vol. 23, No. 7, pp. 396–410.

Identify Verification Through Keyboard Characteristics; David Umphress and Glen Williams; Int. J. Man–Machine Studies (1985), pp. 263–273; (1985) Academic Press Inc. (London) Limited.

Neural Networks; Aglorithms, Applications and Programming Techniques; by James A. Freeman and David M. Skapura; Addison–Wesley Publishing Co., (1991), pp. 20,21, 128–131, 264–273, and 286–289.

RAW DATA

| | PRESS | RELEASE | TIME |
|---|---|---|---|
| SHIFT | ⌨ | | 0 |
| J | ⌨ | | 87 |
| SHIFT | | ⌨ | 177 |
| J | | ⌨ | 186 |
| O | ⌨ | | 220 |
| E | ⌨ | | 339 |
| O | | ⌨ | 347 |
| Y | ⌨ | | 409 |
| E | | ⌨ | 462 |
| | ⌨ | | 535 |
| Y | | ⌨ | 571 |
| SHIFT | ⌨ | | 659 |
| | | ⌨ | 668 |
| R | ⌨ | | 769 |
| SHIFT | | ⌨ | 821 |
| R | | ⌨ | 859 |
| O | ⌨ | | 894 |
| G | ⌨ | | 974 |
| O | | ⌨ | 1012 |
| G | | ⌨ | 1054 |
| E | ⌨ | | 1076 |
| R | ⌨ | | 1179 |
| E | | ⌨ | 1243 |
| S | ⌨ | | 1285 |
| R | | ⌨ | 1400 |
| S | | ⌨ | 1433 |
| ENTER | ⌨ | | 1478 |
| ENTER | | ⌨ | 1572 |

*FIG. 4a*

HOLD TIMES

| KEY | HOLD |
|---|---|
| SHIFT | 177 |
| J | 99 |
| O | 127 |
| E | 123 |
| Y | 162 |
| (space) | 133 |
| SHIFT | 162 |
| R | 90 |
| O | 118 |
| G | 80 |
| E | 167 |
| R | 221 |
| S | 148 |
| ENTER | 94 |

FIG. 4b

DIGRAPH LATENCY TIMES

| DIGRAPH | LATENCY |
|---|---|
| SHIFT–J | −90 |
| J–O | 34 |
| O–E | −8 |
| E–Y | −53 |
| Y–(space) | −36 |
| (space)–SHIFT | −9 |
| SHIFT–R | −52 |
| R–O | 35 |
| O–G | −38 |
| G–E | 22 |
| E–R | −64 |
| R–S | −115 |
| S–ENTER | 45 |

| [ 0/ 2 ] | [ 0/ 2 ] | [ 0/ 1 ] | [ 0/ 4 ] | [ 0/ 3 ] |
|---|---|---|---|---|
| [ 0/ 6 ] | [ 0/ 1 ] | [ 0/ 1 ] | [ 0/ 2 ] | [ 0/ 2 ] |
| [ 0/ 3 ] | [ 0/ 1 ] | [ 0/ 2 ] | [ 0/ 2 ] | [ 0/ 3 ] |
| [ 8/ 0 ] | [ 0/ 0 ] | [ 0/ 1 ] | [ 0/ 1 ] | [ 0/ 3 ] |
| [ 6/ 0 ] | [ 5/ 0 ] | [ 5/ 0 ] | [ 1/ 0 ] | [ 0/ 3 ] |

*FIG. 6a*

| [ 0/ 2 ] | [ 0/ 2 ] | [ 0/ 2 ] | [ 0/ 2 ] | [ 0/ 2 ] |
|---|---|---|---|---|
| [ 0/ 2 ] | [ 0/ 1 ] | [ 0/ 3 ] | [ 0/ 1 ] | [ 0/ 1 ] |
| [ 0/ 4 ] | [ 0/ 2 ] | [ 0/ 2 ] | [ 0/ 2 ] | [ 0/ 4 ] |
| [ 9/ 0 ] | [ 0/ 1 ] | [ 0/ 2 ] | [ 0/ 1 ] | [ 0/ 3 ] |
| [15/ 0 ] | [ 2/ 1 ] | [ 0/ 2 ] | [ 0/ 1 ] | [ 0/ 2 ] |

*FIG. 6b*

| [ 8/ 0 ] | [ 3/ 1 ] | [ 0/ 3 ] | [ 0/ 2 ] | [ 0/ 4 ] |
|---|---|---|---|---|
| [ 9/ 0 ] | [ 1/ 0 ] | [ 0/ 2 ] | [ 0/ 2 ] | [ 0/ 2 ] |
| [ 5/ 0 ] | [ 0/ 1 ] | [ 0/ 2 ] | [ 0/ 1 ] | [ 0/ 4 ] |
| [ 0/ 2 ] | [ 0/ 2 ] | [ 0/ 1 ] | [ 0/ 0 ] | [ 0/ 2 ] |
| [ 0/ 3 ] | [ 0/ 1 ] | [ 0/ 4 ] | [ 0/ 3 ] | [ 0/ 2 ] |

*FIG. 6c*

| SUBJ. # | KEY STROKES | TRAINING DATA SETS IMP. | TRAINING DATA SETS USER | TESTING DATA SETS IMP. | TESTING DATA SETS USER | DATA SETS REJECTED IMP. | DATA SETS REJECTED USER |
|---|---|---|---|---|---|---|---|
| 1 | 15 | 43 | 26 | 30 | 10 | 2 | 0 |
| 2 | 19 | 43 | 26 | 30 | 10 | 2 | 0 |
| 3 | 14 | 64 | 74 | 48 | 9 | 1 | 0 |
| 4 | 18 | 46 | 25 | 30 | 9 | 0 | 0 |
| 5 | 17 | 43 | 25 | 30 | 10 | 1 | 2 |
| 6 | 12 | 44 | 26 | 30 | 10 | 3 | 0 |
| 7 | 14 | 44 | 26 | 30 | 9 | 0 | 0 |
| 8 | 16 | 67 | 73 | 48 | 10 | 6 | 0 |
| 9 | 14 | 45 | 26 | 30 | 10 | 0 | 0 |
| 10 | 13 | 42 | 26 | 30 | 10 | 3 | 0 |
| 11 | 14 | 45 | 26 | 40 | 10 | 2 | 0 |
| 12 | 18 | 44 | 26 | 30 | 10 | 0 | 0 |
| 13 | 12 | 44 | 25 | 30 | 10 | 3 | 0 |
| 14 | 15 | 43 | 24 | 30 | 10 | 4 | 0 |
| 15 | 15 | 40 | 26 | 30 | 10 | 0 | 0 |
| 16 | 25 | 42 | 22 | 30 | 10 | 1 | 0 |
| 17 | 15 | 44 | 26 | 30 | 9 | 0 | 0 |
| 18 | 22 | 41 | 26 | 30 | 9 | 2 | 0 |
| 19 | 18 | 46 | 26 | 30 | 10 | 0 | 2 |
| 20 | 17 | 43 | 25 | 30 | 9 | 0 | 0 |
| 21 | 15 | 43 | 26 | 30 | 10 | 1 | 0 |
| 22 | 14 | 46 | 25 | 30 | 10 | 1 | 0 |
| 23 | 17 | 45 | 26 | 30 | 9 | 0 | 0 |
| 24 | 11 | 40 | 26 | 30 | 9 | 11 | 0 |
| 25 | 14 | 45 | 25 | 30 | 9 | 2 | 0 |
| AVG. | 15.8 | 45.3 | 29.3 | 31.8 | 9.6 | 1.8 | 0.16 |
| MIN | 11 | 40 | 22 | 30 | 9 | 0 | 0 |
| MAX | 25 | 67 | 74 | 48 | 10 | 11 | 2 |
| TOTAL | | | | 796 | 241 | 45 | 4 |
| TOTAL AS A PERCENT | | | | | | | |

*FIG. 9a*

| DISTANCE RESULTS | | ADALINE RESULTS | | NEURAL RESULTS | | BEST RESULTS | |
|---|---|---|---|---|---|---|---|
| IMP. | USER | IP | FA | IP | FA | IP | FA |
| 0 | 0 | 1 | 0 | 0 | 1 | 0 | 0 |
| 0 | 0 | 2 | 4 | 0 | 2 | 0 | 0 |
| 0 | 1 | 0 | 0 | 0 | 0 | 0 | 0 |
| 0 | 3 | 1 | 0 | 0 | 0 | 0 | 0 |
| 0 | 3 | 0 | 2 | 0 | 3 | 0 | 2 |
| 0 | 4 | 2 | 1 | 0 | 1 | 0 | 4 |
| 0 | 0 | 0 | 0 | 0 | 0 | 0 | 0 |
| 0 | 2 | 0 | 3 | 0 | 3 | 0 | 2 |
| 0 | 7 | 1 | 4 | 0 | 2 | 0 | 2 |
| 0 | 0 | 3 | 0 | 0 | 1 | 0 | 0 |
| 0 | 2 | 1 | 0 | 0 | 0 | 0 | 0 |
| 0 | 3 | 3 | 4 | 0 | 4 | 0 | 3 |
| 0 | 2 | 1 | 4 | 0 | 1 | 0 | 1 |
| 0 | 0 | 2 | 1 | 0 | 0 | 0 | 0 |
| 0 | 2 | 0 | 0 | 0 | 0 | 0 | 0 |
| 0 | 0 | 0 | 0 | 0 | 0 | 0 | 0 |
| 0 | 0 | 2 | 1 | 0 | 0 | 0 | 0 |
| 0 | 3 | 2 | 3 | 0 | 9 | 0 | 3 |
| 0 | 1 | 1 | 1 | 0 | 3 | 0 | 1 |
| 0 | 2 | 0 | 1 | 0 | 2 | 0 | 1 |
| 0 | 0 | 0 | 1 | 0 | 0 | 0 | 0 |
| 0 | 0 | 2 | 2 | 0 | 1 | 0 | 0 |
| 0 | 9 | 0 | 0 | 0 | 0 | 0 | 0 |
| 0 | 1 | 1 | 1 | 0 | 1 | 0 | 1 |
| 0 | 3 | 2 | 3 | 0 | 0 | 0 | 0 |
| 0 | 1.92 | 1.08 | 1.44 | 0 | 1.36 | 0 | 0.8 |
| 0 | 0 | 0 | 0 | 0 | 0 | 0 | 0 |
| 0 | 9 | 3 | 4 | 0 | 9 | 0 | 3 |
| 0 | 36 | 27 | 36 | 0 | 34 | 0 | 20 |
| 0 | 19.9 | 3.4 | 14.9 | 0 | 14.1 | 0 | 8.3 |

*FIG. 9b*

| SUBJ. # | KEY STROKES | TRAINING DATA SETS IMP. USER | | TESTING DATA SETS IMP. USER | | DATA SETS REJECTED IMP. USER | | DISTANCE RESULTS IP FA | | ADALINE RESULTS IP FA | | BEST RESULTS IP FA | |
|---|---|---|---|---|---|---|---|---|---|---|---|---|---|
| 1 | 17 | 21 | 48 | 30 | 15 | 2 | 1 | 0 | 6 | 3 | 1 | 0 | 6 |
| 2 | 16 | 20 | 48 | 30 | 15 | 1 | 0 | 0 | 7 | 8 | 1 | 0 | 7 |
| 3 | 16 | 21 | 47 | 30 | 15 | 1 | 0 | 0 | 5 | 11 | 0 | 0 | 5 |
| 4 | 17 | 20 | 48 | 30 | 15 | 2 | 4 | 0 | 1 | 2 | 2 | 0 | 1 |
| 5 | 18 | 21 | 47 | 30 | 15 | 0 | 0 | 0 | 3 | 3 | 0 | 0 | 3 |
| 6 | 15 | 21 | 48 | 30 | 15 | 1 | 0 | 0 | 8 | 2 | 1 | 0 | 8 |
| 7 | 14 | 21 | 48 | 30 | 30 | 3 | 2 | 0 | 17 | 15 | 3 | 0 | 17 |
| 8 | 15 | 21 | 47 | 30 | 15 | 0 | 0 | 0 | 1 | 0 | 4 | 0 | 1 |
| 9 | 16 | 21 | 48 | 30 | 15 | 0 | 1 | 0 | 0 | 0 | 3 | 0 | 0 |
| 10 | 16 | 21 | 48 | 30 | 15 | 1 | 1 | 0 | 3 | 1 | 1 | 0 | 3 |
| 11 | 16 | 20 | 48 | 30 | 15 | 1 | 0 | 0 | 0 | 0 | 0 | 0 | 0 |
| 12 | 17 | 21 | 48 | 30 | 15 | 0 | 1 | 0 | 0 | 2 | 2 | 0 | 0 |
| 13 | 15 | 21 | 48 | 30 | 15 | 0 | 1 | 0 | 2 | 1 | 0 | 0 | 2 |
| 14 | 14 | 21 | 47 | 30 | 15 | 0 | 0 | 0 | 11 | 8 | 1 | 0 | 1 |
| 15 | 12 | 21 | 48 | 30 | 15 | 0 | 0 | 0 | 1 | 0 | 0 | 0 | 0 |
| 16 | 16 | 21 | 47 | 30 | 15 | 0 | 0 | 1 | 14 | 9 | 4 | 1 | 14 |
| 17 | 15 | 42 | 48 | 54 | 15 | 0 | 1 | 0 | 0 | 0 | 2 | 0 | 0 |
| 18 | 17 | 21 | 48 | 30 | 15 | 0 | 0 | 0 | 4 | 0 | 1 | 0 | 1 |
| 19 | 13 | 20 | 48 | 30 | 15 | 1 | 0 | 0 | 6 | 14 | 7 | 0 | 6 |
| 20 | 16 | 42 | 47 | 54 | 15 | 5 | 0 | 0 | 0 | 1 | 2 | 0 | 0 |
| 21 | 12 | 21 | 47 | 30 | 15 | 0 | 1 | 0 | 8 | 3 | 5 | 0 | 8 |
| AVG. | 15.4 | 22.8 | 47.7 | 32.3 | 15.7 | .86 | .62 | .05 | 4.6 | 3.95 | 1.9 | .05 | 3.95 |
| MIN | 12 | 20 | 47 | 30 | 15 | 0 | 0 | 0 | 0 | 0 | 0 | 0 | 0 |
| MAX | 18 | 42 | 48 | 54 | 30 | 5 | 4 | 1 | 17 | 15 | 7 | 1 | 17 |
| TOTAL | | | | 678 | 330 | 18 | 13 | 1 | 97 | 83 | 40 | 1 | 83 |
| TOTAL AS A PERCENT | | | | | | | | .15 | 29.4 | 12.2 | 2.12 | 0.15 | 25.2 |

*FIG. 10*

METHOD AND APPARATUS FOR VERIFICATION OF A COMPUTER USER'S IDENTIFICATION, BASED ON KEYSTROKE CHARACTERISTICS

BACKGROUND OF THE INVENTION

1. Field of the Invention:

The present invention relates to a method and apparatus for verifying the identity of an individual by examining keystroke characteristics of the individual. The present invention is applicable to any type of system in which access to the system is desired to be limited to authorized users.

2. Discussion of the Background:

It is often desired to have a secure system in which only authorized users are able to access the system. One way to control access to a system is to assign to a person a password which upon entering into the system, allows access. However, a problem with such a system is that unauthorized users often discover a person's password. Therefore, a more secure method of permitting access to a system would be to base the decision of whether to allow a person access to the system using physical characteristics of the person which are impossible or very difficult to copy. Such systems might use a palm or finger print, retina scan, or other physical feature of a person. However, the use of finger or palm prints may not be very secure in that such systems are prone to deception by pressing a photographic or xerographic image of the physical feature onto the device attempting to verify an individual's identity. A further problem with such systems is that they require additional expensive hardware.

Research has been performed which indicates that the way an individual types is unique to that person and has been called a personal and physical attribute (see Forsen et al., "Personal Attributes Authentication Techniques", Rome Air Development Center Report RADC-TR-77-1033 (1977)). U.S. Pat. No. 4,805,222 issued to Young et al. discloses a system for verifying the identity of an individual based on keystroke dynamics. Young et al. create a template of a user's keystroke characteristics by creating a Euclidean vector in n-space. When a user is subsequently trying to gain access to the system, the user types a text passage and an Euclidean vector in n-space is created. This vector is compared to a vector corresponding to the template and if the Euclidean distance between the vectors is small enough, the user is allowed access to the system. U.S. Pat. No. 4,621,334, issued to Garcia operates in a similar manner but uses a Mahalanobis distance function to determine the distance between the constructed vectors.

However, a problem with previous systems which use keystroke characteristics for verifying a user's identity is that either they require a large number of keystrokes to determine if the user is authorized, or on the other hand, use a small number of keystrokes but the results produced by the system are not acceptable. For example, Forsen et al. suggest that typing names alone would not provide enough information to make a good identification. Gaines, Lisowski, Press and Shapiro in "Authentication by Keystroke Timing: Some Preliminary Results" (1980) RAND report R-2526-NSF, found that approximately one page of text does not provide certainty for identification. Leggett, Williams and Umpress in "Identity Verification Through Keyboard Characteristics" from International Journal of Man-Machine Studies, 35 pp. 859–870 (1988), used a 537 character test to yield an imposter pass rate (IPR) of 5.0% and a false alarm rate (FAR) of 5.5%.

SUMMARY OF THE INVENTION

Accordingly, one object of this invention is to provide a method and apparatus for verifying the authenticity of a user of a system having a low imposter pass rate, a low false alarm rate, while only requiring a small number of keystrokes from the user.

It is another object of this invention to provide an accurate user verification system which is relatively inexpensive, and can quickly and accurately determine the authenticity of the user.

These and other objects of the invention are accomplished by providing a method and apparatus for quickly, accurately, and relatively inexpensively determining the authenticity of the user. The system operates by first collecting samples containing typing characteristics of an authorized user. Also, imposter training samples are collected. Using timing characteristics of the keystrokes of the collected samples based on key press times and key release times, or other characteristics of keystrokes, vectors are constructed for each collected sample and fed into a self-organizing neural network for purifying the samples. The self-organizing network outputs purified samples of the authorized user which are similar in nature to each other while discarding samples of the user which are not similar.

Next, the purified training samples are fed into a second neural network along with the imposter training samples and the neural network is trained to output whether an input sample is from an authorized user. Last, when a user desires access to the system, the user types the previously determined keystroke sequence which is constructed into a vector and fed into the trained neural network. Note that alternative embodiments of the invention do not require sample purification. The imposter samples alternatively can be synthesized by a computer, for example, thus eliminating the need to collect imposter training samples from other people. The neural network is then used to determine whether or not the user is authorized.

Alternatively, instead of using a trained neural network to determine whether the user is authorized or not, the purified user samples can be compared to a vector constructed of the sample desiring authentication using a Euclidean distance method in n-space to determine whether or not the user is authorized. Further, the purification can be performed by a statistical method instead of using the self-organizing neural network. Note that alternative embodiments of the invention do not require sample purification. The imposter samples, alternatively can be synthesized by a computer, for example, thus eliminating the need to collect typed imposter training samples.

The method and apparatus of the present invention allows a low imposter pass rate and a low false alarm rate yet only requires the user to type in a small number of characters such as a name or password consisting of approximately 15 keystrokes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a illustrates the times at which keys are pressed and released when a user types the name "Joey Rogers";

FIG. 4b illustrates the hold times for the keys used in typing "Joey Rogers" abstracted from the data illustrated in FIG. 4a;

FIG. 4c illustrates the digraph latency times of the keys used to type "Joey Rogers" calculated from the data illustrated in FIG. 4a;

FIGS. 6a–6c illustrate the groupings produced by a 5×5 self-organizing network;

FIGS. 9a, 9b and 10 illustrate test data obtained from two user groups using the present invention.

DESCRIPTION OF THE PREFERRED EMBODIMENTS

Figure 1:
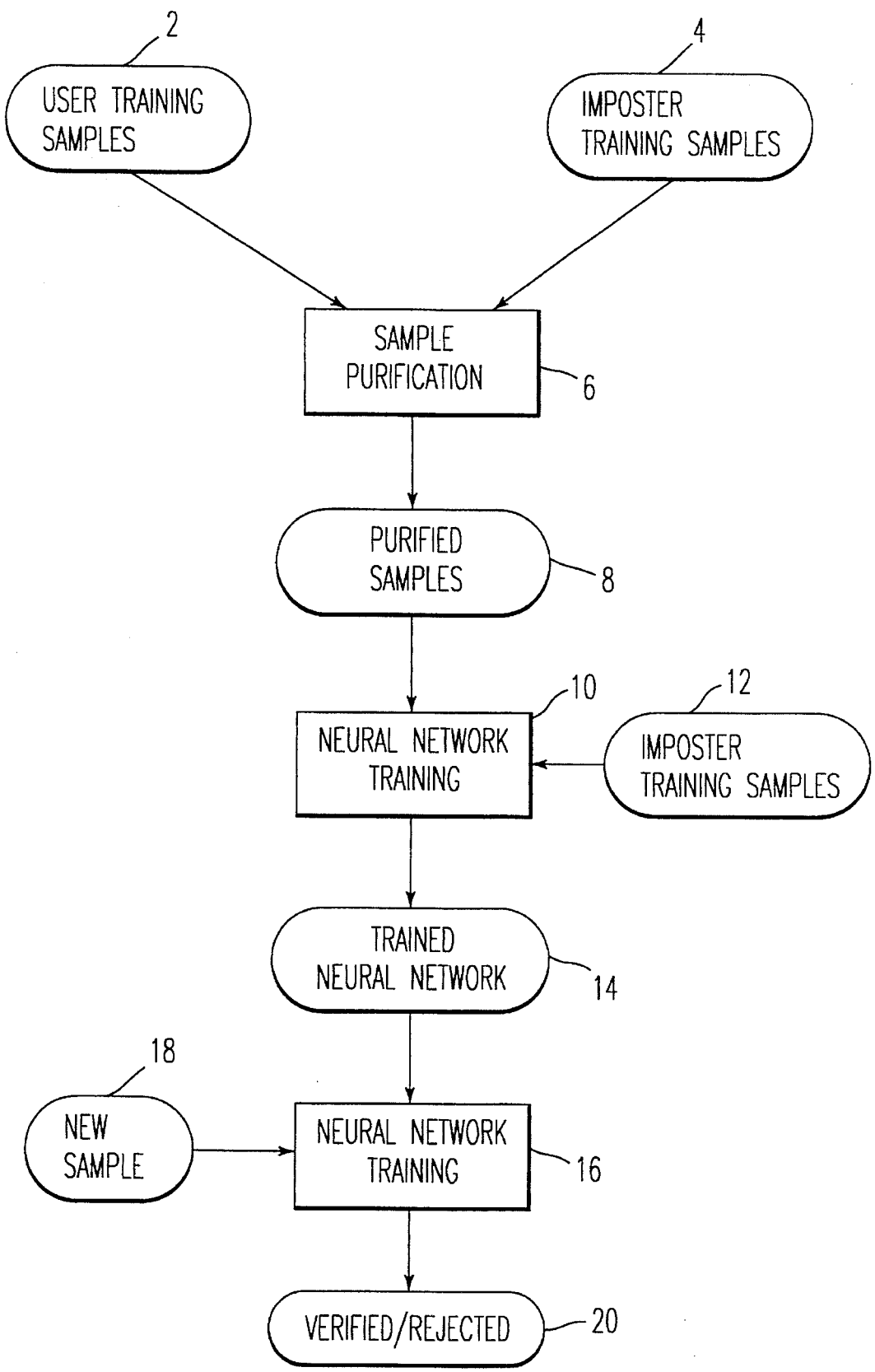
FIG. 1 is a flowchart of a process of a first embodiment of the invention.

Referring now to the drawings, wherein like reference numerals designate identical or corresponding parts throughout the several views, and more particularly to FIG. 1, there is illustrated a process used by a first embodiment of the invention. The process of FIG. 1 analyzes keystroking patterns of an authorized user and imposter training samples to determine if a new sample is from the authorized user or an imposter.

Examining the steps of FIG. 1, user training samples 2 are created, for example, by having the authorized user type a short series of characters which can be a password, name, both a password and name, or any other series of keystrokes. Experimentation has shown that 11 to 25 keystrokes are adequate but the number of keystrokes can of course be higher or lower than this number.

There must be a sufficient number of user training samples for the system to properly determine whether a new sample is from an authorized user or from an imposter. Twenty user training samples appear to be adequate and 40 to 60 user training samples did not significantly affect the accuracy of the results produced by the system.

Imposter training samples 4 are created by any keystroke source other than the authorized user typing samples in his usual typing manner. Experimentation has shown that using a number of different people, excluding the authorized user to create the imposter training samples produces good results. However, the imposter training samples can be created by any keystroke source and can be computer synthesized. The synthesized imposter training samples can be synthesized by making random or predetermined alterations to an authorized user's keystroke characteristics profile. The number of imposter training samples used in experiments has been from between 20 to 50 imposter training samples, although the use of a smaller number or higher number of training samples is possible.

After the samples are collected, the first step in the process used by the first embodiment of the invention is a sample purification step 6. One way in which the purification step can be performed is to use a self-organizing neural network having input thereto the user training samples and the imposter training samples. The self-organizing neural network groups the input samples. Then the input user training samples which have characteristics different from other user training samples or similar to the imposter training samples are discarded and the result is the purified samples 8. Complete details of the sample purification using a self-organizing neural network will be discussed in detail below.

There is no requirement to have the purification step use a self-organizing neural network and the present invention encompasses other types of purification steps. For example, a statistical analysis can be performed to purify the user training samples 2.

One statistical analysis type of purification which can be performed is to examine the makeup of the user training samples, although this will probably result in reduced performance as compared to the self-organizing network purification. If there is a portion of the training samples which the authorized user does not type in the same manner, that portion of the user training sample can be discarded. For example, if the user types his first and last name, there may be relatively high variance times between the last character of the user's first name and the first character of the user's last name. Therefore, a purification step can eliminate the portion of the input sample relating to the time between the two names. Also, if an authorized user types any other portion of the training samples in a manner having a relatively high variance, the data relating to those letters can be discarded and not used for testing purposes. This type of purification does not require imposter training samples.

Further, the purification step can encompass any type of purification of the authorized user's input samples. These methods can use purifications based on statistical methods, methods based on probability formulas, neural networks, or any other type or purification. For example, the standard deviation for the authorized user samples can be calculated and if certain samples exceed the standard deviation, have a predetermined relationship to the standard deviation, or have a portion which has a high variance, those user training samples or portions thereof can be discarded. Additionally, it is also possible for embodiments of the present invention to operate without the purification step.

The second step of the process illustrated in FIG. 1 is the neural network training step 10. The purified samples 8 and imposter training samples 12 are used to produce a trained neural network. The imposter training samples 12 can be the same as imposter training samples 4 or constructed in a manner similar to the manner in which imposter training samples 4 are created. The trained neural network can be for example, an ADALINE ("ADAptive LINear Element") neural element or a back propagation neural network, both of which are well-known in the field of neurocomputing. While an ADALINE is not a true network because it usually contains only one processing element, the term "neural network" in the context of this writing is envisaged to include all neural processing structures including the ADALINE neural element, the back propagation network, and all other neural processing structures. To train the networks, when the purified samples are input, the output indicating an authorized or verified user is used as a training output. For the imposter training samples, an output of imposter or rejected is used to train the neural networks. A more detailed description of the neural network training can be found below.

The output of the neural network training step 10 is a trained neural network 14. The system can now analyze or test new user samples 18 to determine whether the typist who entered the new samples is an authorized user or not. The trained neural network 14 produces an output 20 indicating whether the user is the authorized user or an imposter, and thereby verifying or rejecting the user. The output 20 of the neural network 16 can be used to allow the user to gain access to a computer system or can be used to deny the user access. When a neural network indicates that a user is authorized, one could consider there to exist at least a predetermined threshold of similarity between the sample to be tested and a profile of the user's keystroke characteristics.

Figure 2:
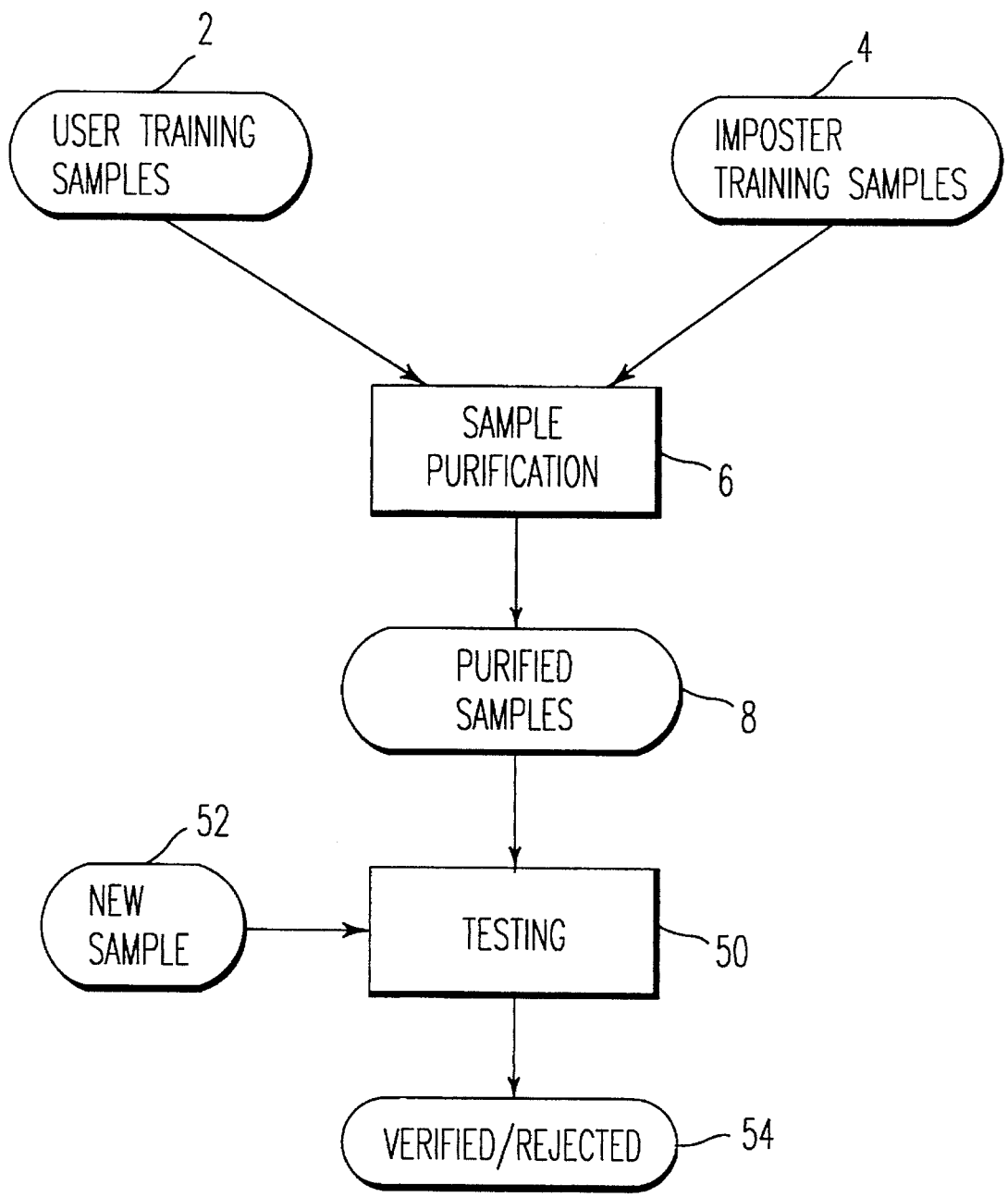
FIG. 2 is a flowchart of a process of a second embodiment of the invention.

FIG. 2 illustrates a process of the second embodiment of the invention which is also used to detect whether a user of a keyboard is authorized or an imposter. Items 2–8 of FIG. 2 are identical to items 2–8 of FIG. 1. However, FIG. 2 does not use a trained neural network to determine whether the user is authorized or an imposter. The purified samples 8 are used in a testing step 50 for determining whether the new samples 52 are from an authorized user or an imposter. The testing step 50 can test the new samples 52 using statistical methods or any other testing method. When any of these testing methods indicates that a user is authorized, one could consider there to exist at least a predetermined threshold of similarity between the sample to be tested and a profile of the user's keystroke characteristics. One method to determine a similarity between samples is to determine a distance such as the Euclidean distance between a vector representing the purified samples 8 and a vector representing new samples 52. Other methods for determining similarity may include piecewise linear classifiers, discriminate functions, and linear classifiers. In a distance determination method, if the distance between a vector representing the purified samples and the vector of a new sample is too large, an indication can be given that the new sample is from an imposter, thereby rejecting the new sample. If the vectors are close enough in distance, an output indicating that the user is an authorized user can be used to allow the user access to the system as the user is a verified user.

The testing step can also calculate the Euclidean distance between new sample vectors and vectors of the purified samples according to the system disclosed in U.S. Pat. No. 4,805,222, entitled "Method and Apparatus for Verifying an Individual's Identity" or through another method such as the Mahalanobis distance function as disclosed in U.S. Pat. No. 4,621,334 issued to Garcia and entitled "Personal Identification Apparatus" both of which are incorporated herein by reference.

Figure 3:
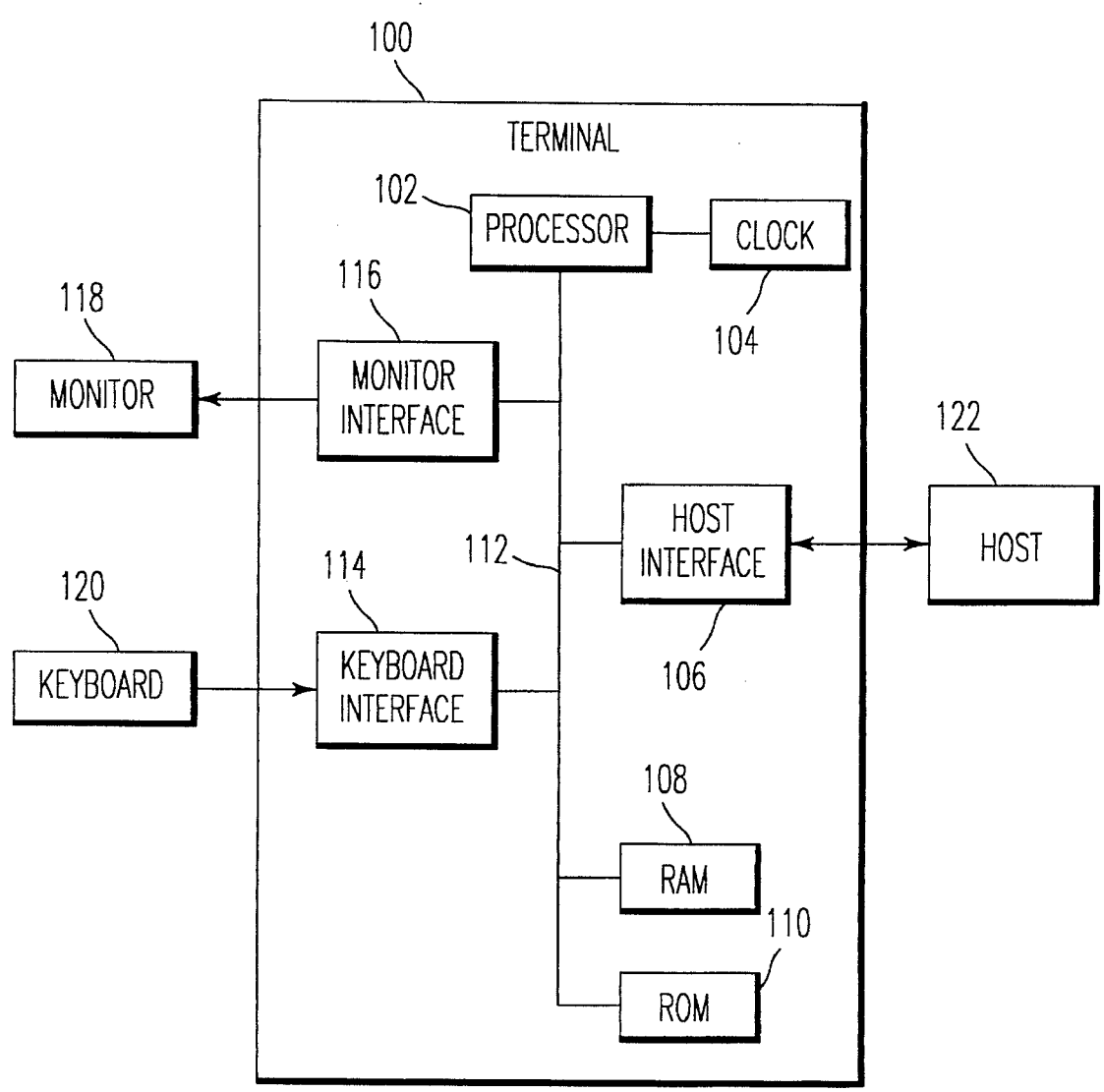
FIG. 3 illustrates exemplary hardware used by the present invention.

The present invention is applicable to any system in which it is necessary to verify the authenticity of a user. FIG. 3 illustrates the hardware of an exemplary system used by the present invention. The system of FIG. 3 can be used, for example, to access a host computer 122 and terminal 100 can be a personal or any type of computer or system for accessing the host 122. Alternatively, the present invention can be used to gain access to a computer which is not connected to a host.

A user's typing or keystroke characteristics can be measured by examining the timing of the keystrokes or the pressure of the keystrokes. The present invention will be described using a conventional keyboard 120 in which the timing of the keystrokes is measured to construct a vector. This allows conventional keyboards to be used so that the cost of the system can be relatively low. However, the system can also be used with a keyboard which measures the pressure used by a user and the keystroke timing and/or pressure characteristics can be used to determine whether the user is authorized or not. Further, the system is not limited to analyzing time and/or pressure characteristics but can use any feature relating to keystroke characteristics including keystroke features relating to keystroke acceleration and deceleration.

To construct a vector representing the timing of keystroke characteristics, the terminal 100 has clock 104 connected to processor 102 so that the timing of the keystrokes can be determined. The terminal 100 also contains components such as host interface 106 for connecting the terminal to the host, a RAM 108, a ROM 110, a system bus 112, a keyboard interface 114 and an optional monitor interface 116 connected to optional monitor 118, for example. Processor 102 and clock 104 are used to construct the vector representing the keystroke characteristics of the user. The vector representing the keystroke characteristics can be sent to host 112 so that host 112 can determine whether the user is an authorized user or an imposter. Alternatively, terminal 100 might contain the program used to determine whether the user is authorized or an imposter. The present invention has been successfully tested using a data capture program utilizing the X window system running on an IBM® R/S 6000 graphics workstation.

While the system has been described as a terminal 100 such as a personal computer accessing a host computer 122, the present invention is applicable to any type of system in which it is necessary to authenticate the identity of a user. Therefore, keyboard 120 is not limited to a conventional computer keyboard but can be any type of keyboard including a keypad such as the push button keys of a telephone, the key pad of an automatic teller machine (ATM), a key pad on a vehicle which allows a user access into the vehicle or which starts the engine of the vehicle, or any type of keyboard means.

The system can be used, for example, by long distance systems to determine whether a user of the long distance code is an authorized user. A current problem with telephone credit cards is that the telephone credit card number can be easily viewed as a user enters the number in a telephone system and the present invention would prevent unauthorized users from using the telephone credit card number. The present invention could also be used on a key pad in which a user enters an access code to gain entry into a building or portion thereof.

A minor modification may have to be made to some types of terminals such as IBM 3270, DEC VT-100, TTY, or other terminals having limited or no independent processing ability which are connected to a host computer for the present invention to collect keystroke data. A problem with this type of system is that the terminal sends data in packets to the host 122 and there is no existing means within the terminal to determine the keystroke characteristics of the user. Therefore, additional hardware such as a clock, RAM, ROM, and a processor, for example, could be added to the terminal so that the keystroke characteristics can be determined as the user is typing at the keyboard. When these keystroke characteristics are gathered, they can then be sent to the host 122 where the host determines whether the user is authorized or not. Alternatively, the terminal can be programmed to determine whether the user is authorized or not.

A convenient way to represent the data collected by analyzing a user's keystroke characteristics is to use an n-dimensional vector in n-space, n being the number of components of the vector. The following explanation of the vector construction will be made using timing characteristics but the vector can be constructed to include any information pertaining to keystroke information. FIG. 4a illustrates the raw data collected when a user typed the name "Joey Rogers". The raw data contains the time at which a key was pressed and the time at which the key was released. The raw data is then used to construct the vector used in the analysis of the keystroke information.

When the data representative of the keystrokes is collected, it is possible to store the characters as ASCII characters or key scan characters. The advantages of using a key scan character as opposed to an ASCII character is that there are different keyboard scan characters for the left shift, right shift, and caps lock keys. If a user has particular idiosyncratic typing characteristics and uses a caps lock key instead of a shift key or always uses a left shift key or a right shift key, the present invention can use this idiosyncratic information to determine if the vector of a new sample to be tested contains at least the same components as the vectors from the authorized user. The idiosyncratic information can be used to reject imposter training samples and samples to be tested by the system.

One way in which vectors can be used to represent the data is to construct the vector to have interleaved hold times and digraph latency times. The hold times are illustrated in FIG. 4b and are the length of time a key was held down. The hold time of a key is obtained by subtracting the press time of the key from the release time of the key. A digraph is a two keystroke combination. The digraph latency time used by the present invention is obtained by subtracting a first key's release time from a second key's press time. For example, to obtain the digraph latency time for the keystroke combination JO, the press time of O has subtracted therefrom the release time of J; 220 minus 186 gives the JO digraph latency time of 34. Similarly, the digraph latency time of OE is the press time of E minus the release time of O; 339 minus 347 is equal to a digraph latency time of −8.

A vector representing the keystroke characteristics is constructed, for example, by interleaving the hold times and digraph latency times. A vector for a keystroke sample can be represented by a vector such as:

< $Hold_1$ >< $Latency_{1,2}$ >< $Hold_2$ >< $Latency_{2,3}$ >< $Hold_3$ > . . .
A sample vector constructed from the data of FIG. 4a, as calculated in FIGS. 4b and 4c for "Joey Rogers" would be:

177 −90 99 34 127 −8 123 −53 162 −36 133 −9 162 . . .

The ordering of the elements of the vector is not important but the vectors should be constructed such that the samples relating to a user are constructed in the same manner so that they can be properly compared.

The construction of the vector representing the raw data by interleaving the hold times and digraph latency times is not disclosed in any known prior art. For example, U.S. Pat. No. 4,805,222 issued to Young et al discloses the construction of a vector using time periods between successive keystrokes. However, the present invention is not limited to the above described construction of the vector used to represent the data. The vector can be made up of data pertaining to the key press times, key release times, digraph latency times, key hold times, keystroke pressure, keystroke acceleration or deceleration, or any feature relating to a user's keystroke characteristics.

The components of the vectors are physical characteristics of a person's keystroke characteristics. These physical characteristics are used to construct vectors which are processed, transmitted, and stored within the system as signals.

Once the data is collected and placed in vector format, the vectors can be analyzed to determine if the user is authorized or an imposter. A step of purifying authorized user samples has been found to be beneficial in reducing the imposter pass rate (IPR) and reducing the false alarm rate (FAR). One way in which the data can be purified is to feed authorized user samples and imposter samples into a self-organizing neural network such as the known Kohonen neural network.

The Kohonen network is part of the unsupervised class of neural networks. Unlike other networks such as the back propagation neural network whose training requires a set of corresponding input and output vectors, the Kohonen self-organizing network needs only a set of input vectors. The input vectors are then grouped according to their characteristics through unsupervised learning.

The input vectors of the self-organizing network are used to train a set of weight vectors to represent a generalized picture of the input data. The training organizes the data via the weight vectors according to the data's inherent relationships which need not be known prior to training. After training is completed, each input vector corresponds to only one weight vector and all input vectors corresponding to that weight vector form a cluster.

Inputs to the self-organizing network are represented as vectors whose components contain the input values for a giving training instance:

$$I = x_1, x_2, x_3, \ldots x_n \quad (1)$$

Figure 5:
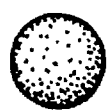
FIG. 5 is an illustration of a 5×5 self-organizing neural network.

The self-organizing network is made up of weight vectors which are arranged in a table where each weight vector is indexed by its row and column as shown in FIG. 5. A 5×5 self-organizing network such as that illustrated in FIG. 5 has been found to cluster the data in an acceptable manner so that it can be purified. However, the present invention is applicable to any size self-organizing network which is less than or greater than 5×5. The number of input samples can be a factor in determining the size of the network.

While the self-organizing network size is somewhat arbitrary, there are guidelines for helping determine the ideal size. If the network is too small, imposter contaminated clusters will always result; if it is too large, too many clusters will be formed and no purification can occur. Experimentation has shown that a 5×5 self-organizing network is an acceptable size for approximately 15 character keystrokes which are used to construct a vector in an n-space of 30 (a hold time and digraph latency time for each keystroke, for example) when there are approximately 20 to 50 user training samples and 20 to 50 imposter training samples. The self-organizing network can also be used to only group similar authentic user samples without any imposter samples being input into the network. In this case, there are no contaminated clusters, but samples which fall into clusters containing less than a given number (for example, less than 2 samples) are eliminated.

The use of self-organizing neural networks is known to one of ordinary skill in the art. However, a description of an exemplary manner of using a self-organizing neural network in the present invention will be given for clarity sake. Initially, each node or neuron of the self-organizing network has a vector of randomly assigned weights. Training the self-organizing network involves presenting each input vector in the training set to the network and updating the weights in the self-organizing network a predetermined number of times. As each input vector is presented to the network during training, the weight vector with the smallest Euclidean distance or other distance from the input vector is found to be the "winning" weight. The distance between the input vector and each weight vector is computed using:

$$D_{ij} = \mathrm{Sum}((I_k - W_{ijk})^2) \quad (2)$$

where D is a distance, i is a row in the network, j is a column in the network, I is an input vector, W is a weight vector, and k is an index to the components of the input and weight vectors. The winning weight vector is then updated to better represent the input vector. Also, all weights whose position in the table are within the neighborhood of the winner's table position are updated as well. The neighborhood can be determined in various ways. A simple manner to determine the neighborhood includes all weights within a given number of rows and columns from the winner. The neighborhood size decreases as the network is trained until it reaches 0 and then only the winning weight is updated for the input represented to the network. Each weight vector is updated using:

$$\text{New\_}W_{ijk} 32 \text{ Old\_}W_{ijk} + \text{Alpha} * (I_k - W_{ijk}) \qquad (3)$$

where Alpha is the learning rate or the percentage of change to make at each update. The learning rate also decreases as training progresses. Experimentation has shown that for a 5×5 network, an initial neighborhood size of 3, a learning rate range of 35% to 0.5% and 10,000 training iterations is adequate.

When training is completed, the inputs can easily be clustered since the weight vectors share a one to many relationship with the input vectors. The location of each weight in the table also has topological significance due to the nature of the training. Therefore, the closer the weight vectors' positions in the tables, the more similar their clusters are.

A sample training session of a self-organizing neural network will now be described. Assume that a 5×5 self-organizing neural network such as that illustrated in FIG. 5 is to be used to purify vectors for the keystrokes entered for the name "Joey Rogers". Each sphere in the table of FIG. 5 represents a weight vector. If the vector for "Joey Rogers" has 27 components in n-space, each vector in the self-organizing network will also have 27 components. Initially, the weight vectors components, represented by the spheres in FIG. 5, are assigned at random.

Next, a vector is input into the 5×5 network and the Euclidean distances between the input vector and each of the 25 weight vectors of the map of FIG. 5 are calculated. The vector which is closest in Euclidean distance to the input vector has its weight adjusted according to equation 3. The adjustment of the weight vector closest to the input vector brings that weight vector closer in distance to the input vector. Also, weight vectors in a given neighborhood proximate to the winning vector are also adjusted. Experimentation has found that training the self-organizing map by each of the input vectors ten thousand times is sufficient to purify the input data. As the self-organizing network is being trained, the Alpha term of equation 3 is reduced. The present implementation of the invention decreases Alpha at a constant rate and uses a slightly smaller Alpha for each training iteration than the Alpha of the previous iteration. Alternatively, Alpha can be reduced in bigger steps after a larger number of training iterations. For example, Alpha can be 0.3 for the first 1000 training iterations. Then, Alpha can be 0.25 for the next 1000 training iterations, and Alpha is decreased as the training increases. Of course, any Alpha, any neighborhood size, any type of decrease in Alpha, and any number of training iterations can be used to train the self-organizing network so that the data can be purified.

Once the self-organizing network has been trained, the input data is fed into the trained self-organizing network and assigned to one of the weight vectors. FIGS. 6a–6c illustrate exemplary groupings performed by the trained self-organized networks for different input data. The data of FIG. 6a–6c will be referred to as cells having a number of user samples and imposter samples. The cell will be referred to as (row, column). For example in a 5×5 network, the cell in the upper left corner is (1,1), the cell in the upper right corner is (1,5) and the cell in the low right corner is (5,5). The data which is in each cell is in the format [number of user samples/number of imposter samples]. For example, cell (1,1) of FIG. 6a contains 0 user samples and 2 imposter samples.

Once the data is grouped by the self-organizing network as illustrated in FIG. 6a–6c, any number of preprocessing techniques can be used to produce authorized user samples which are similar in nature. A first version of preprocessing can remove all clusters having only one authorized user sample. For example in FIG. 6a, one cell (5,4) which has only one authorized sample would be removed according to this first version of purification.

A second type of preprocessing would remove all clusters containing both user and imposter samples. For example, FIG. 6a does not contain any clusters in which there are both authorized user samples and imposter user samples. However, cell (5,2) of FIG. 6b contains 2 user samples and 1 imposter sample and a second version of preprocessing would remove this type of cluster.

The data of FIG. 6c illustrates cell (2,2) which has one authorized user sample and 0 imposter samples. This cell, while not containing any imposter samples, contains only one authorized user sample which indicates a probability that this sample is different from the other authorized user samples. Therefore, under a first preprocessing version, this input data would be discarded. Cell (1,2) of FIG. 6c contains three authorized user samples and one imposter sample. If a second version of preprocessing is used, the three authorized samples in this cell should be discarded as they have been grouped in a cell containing an imposter sample.

While the purification step of the data illustrated in FIGS. 6a–6c describes discarding the data when there is either only one user sample in a cluster or removing clusters having both user and imposter samples, other types of preprocessing purification can be performed once the data of FIG. 6a–6c are produced to obtain the purified authorized user samples. For example, a combination of the first preprocessing and second preprocessing versions can be used or any preprocessing steps can be used such that authorized samples which are different from other authorized samples are discarded or authorized samples which are similar to imposter samples are discarded.

As previously stated, the step of sample purification is not limited to the use of a self-organizing network but can use any type of sample purification. As previously described, certain components of the vector can be discarded if there is a variance above a certain tolerance of a specific component of the constructed vectors of the authorized user. Another type of sample purification could use statistical methods instead of a self-organizing network so that samples from an authorized user which are different from other samples of the authorized user are discarded or samples of the authorized user which are similar to imposter samples are discarded.

Once the purified samples 8 of the process illustrated in FIG. 1 are produced by the sample purification step, one embodiment of the present invention then trains a neural network so that the trained neural network can be used for determining whether a new sample 18 input by the user is authorized or not. Again, the term "Neural Network" in this writing refers to all neuro-processing systems, including ADALINE processing elements, where appropriate.

Figure 7:
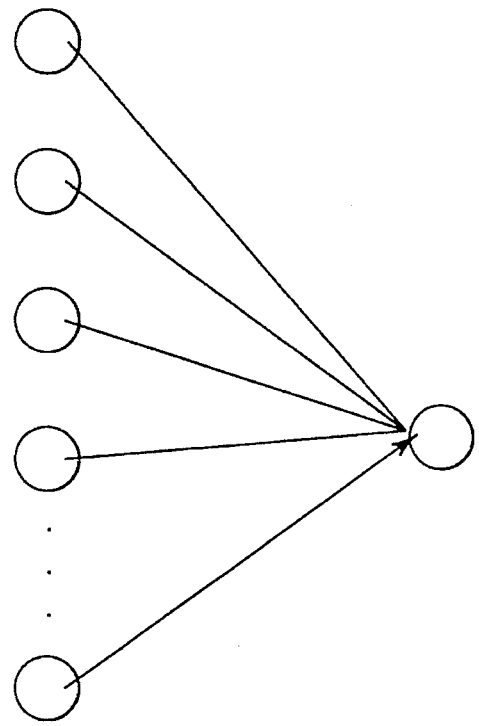
FIG. 7 is an illustration of an ADALINE neural element used in the testing step of the present invention.

One type of neural network system which can be used to determine whether a user is authorized or an imposter is the known ADALINE processing element, illustrated in FIG. 7, which takes multiple input values and produces a single output value. The ADALINE processing element must have at least as many inputs as there are components of a vector to be input.

The training set of data used to modify the ADALINE's weight vector can be viewed as a collection of input vectors with a corresponding output value:

$$I=x_0, x_1, x_2, x_3, \ldots, x_n: O_{desired} \quad (4)$$

where I is an input vector, $O_{desired}$ is the desired output, and each vector component is one component of a training instance, except for the first component ($x_0$) which is a bias term and permanently set to 1, for example.

The ADALINE's output is computed by taking the dot product of the input and weight vectors:

$$O=I \cdot W=i_0*w_0+i_1*w_1+\ldots+i_n*w_n \quad (5)$$

where O is the output, I is an input vector and W is a weight vector.

Training the weight vector is possible since the desired output provides a means of computing an error value for each training instance. The error can be minimized by adjusting the weight vector with a learning law commonly referred to as the delta rule:

$$W_{new}=W_{oit}+(BEI)/\|I\|^2 \quad (6)$$

where B is the percentage of change to make or the learning rate, and E is the error produced by the ADALINE for the given input vector. The error surface created by the ADALINE is a parabolic surface whose low point is the weight vector that produces the minimum error for each input vector in the training set. The delta rule traverses the paraboloidal surface downhill through multiple iterations until the minimum error is achieved. Therefore, the initial values of the weight vector components are unimportant since the delta rule will cause the error to slide down the paraboloidal surface regardless of its initial position.

Once the ADALINE neural element is trained, a trained neural network 14 of FIG. 1 is produced and the system is ready to test whether a sample entered by a user is from an authorized user or an imposter.

In the process of FIG. 1, one or more new samples 18 are fed into the trained network for neural network testing in step 16. In this embodiment of the invention, the trained neural network is simply an ADALINE element as illustrated in FIG. 7 with inputs for each component of the vector. The neural network testing step 16 produces an output at the output of the ADALINE indicating whether the user is an authorized user or an imposter and therefore verifying the user or rejecting him.

Figure 8:
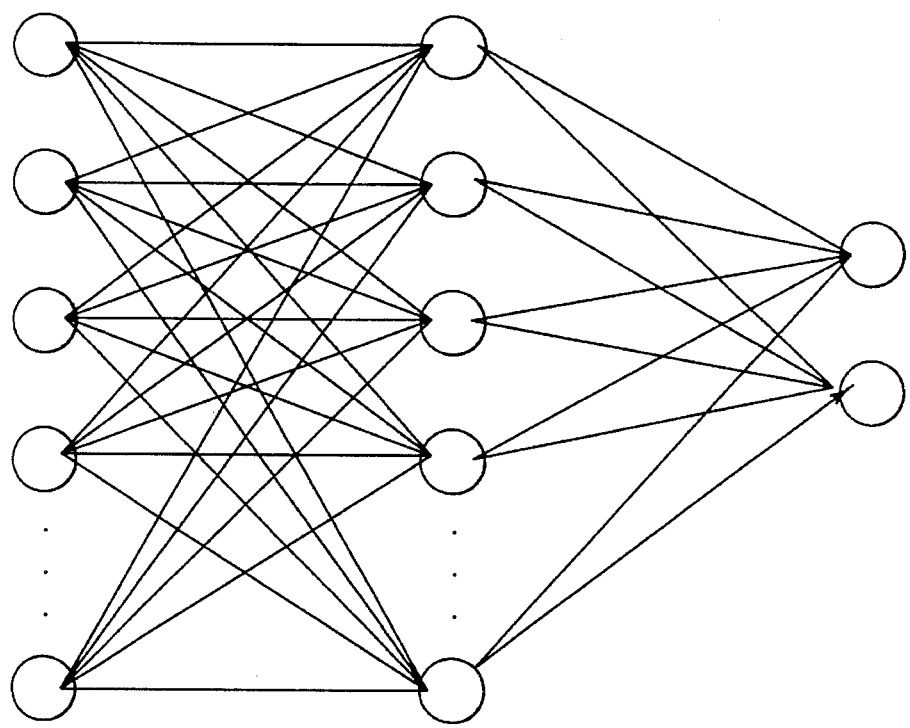
FIG. 8 is an illustration of a back propagation neural network used in the testing step of the present invention.

An alternative type of neural network used for testing whether a user is authorized or an imposter is a known back propagation neural network. FIG. 8 illustrates a three layered back propagation neural network having an input layer on the left side, a middle layer, and an output layer consisting of two nodes. The input layer has as many nodes as there are components of an input vector. While the neural network produces only one output indicating whether the user is an authorized user or an imposter, the present inventors have found that having two output nodes wherein one output is set to a fixed value assists in the training and training rate of the back propagation network. However, the present invention does not require the use of a back propagation network as illustrated in FIG. 8 but any network construction is possible having any number of input, middle, and output nodes including only one output node. Experiments have shown that one middle layer having approximately 90% of the nodes or processing elements as the input layer produces adequate results.

The back propagation network is trained in a somewhat similar manner to that of the ADALINE of FIG. 7. The back propagation network is trained using a training mode wherein the purified vectors are input into the network and a desired output is compared to the output produced at the output node and the difference is used to train the network. A similar process is also performed for the imposter training samples. The neural network essentially trains itself using known back propagation techniques.

The training and operation of the back propagation neural networks is roughly the same as that of the ADALINE processing element. Each neural node of the back propagation network has a weight assigned to each input, and takes the sum of each input multiplied by its weight. This sum is then adjusted by a sigmoidal ('S'-shaped) activation function, and the result is fed as input to the next layer.

Trained back propagation neural network uses the same Delta rule as is used for training the single node of the ADALINE. At the output layer, each output is compared with the desired response, and the weights between the output and middle layers are adjusted accordingly, since the error between the computed output and the desired output is evident.

However, for the middle layer, the error is not obvious, since it is uncertain how much of the error computed at an output node might be due to an error in a given middle layer node. The solution is to 'backpropagate' the errors from each output layer neurode to the middle layer using the same interconnections and weights used to transmit the output from the middle layer to the output layer. This allows computation of the error for each neurode in the middle layer based upon its portion of the blame for the output layer's error. This is computed as:

$$e_i=f'(I)*[\Sigma w_{ij}*E_j] \quad (7)$$

Where $e_i$ is the error for the ith middle-layer neuron and the summation is taking over j where j indicates the jth output layer. The f'(I) term is the derivative of the sigmoid activation function for the middle layer neuron and E is the error of the output.

Once the trained back propagation network such as that illustrated in FIG. 8 is created, the trained network can then be used to determine whether an input sample is from an authorized user or an imposter.

The present invention is not limited to the use of neural networks for testing whether an input sample is from an authorized user or an imposter but can compare the input sample from a user to the previously purified samples using any type of process to determine whether the input sample is from an authorized user or not, as illustrated in step 50 of the process illustrated in FIG. 2.

One such testing technique would be a distance analysis method which is a straightforward statistical technique of quantifying a difference between the purified samples and a new sample. Since each sample is represented as a vector in n-dimensional space, n being the number of keyhold times plus the number of digraph latency times used to construct the vector, for example, a Euclidean distance can be computed between any two samples.

The sum of distances between a new input sample 52 of FIG. 2 and each of the purified samples is computed to provide an average distance between the vector of the new sample and the vectors of the purified sample. Alternatively, the vectors from the purified samples can be averaged and the distance between the resulting average vector and the new input sample 52 can be determined to calculate a distance between the new sample and the average of the purified samples.

Once this distance is calculated, a threshold must be determined so that new samples which are greater than the threshold distance from the purified samples will be marked as coming from an imposter. The initial threshold can be determined by taking the average of the sums of the distances between each purified sample and the other purified sample. Since this threshold value is computed by taking the mean of the representative sample distances, only about half of the new samples provided by the authentic user would pass, assuming that the new samples matched those in the training set. Therefore, the threshold value must be increased. The sum of distances for each imposter sample used in the preprocessing procedure is then computed and the lowest value should be given an approximate upper bound for the threshold. The threshold can now be adjusted somewhere between this upper bound and the average sum of distances for the authentic samples. While almost any position between the two sums should prevent impostors from passing, the closer the threshold is to the user average, the more new authorized user samples will fail. However, the farther away from the upper bound, the greater the probability of preventing future imposter passes. The average of user sums plus 85% of the distance between the average and the upper threshold bound served as the threshold for experiments performed. However, any threshold value can be set after it is calculated or determined in any desired manner.

Once the testing step for either the neural network technique or distance analysis technique or other statistical determination technique determines that a user is an authorized user, the authorized user can then be given access to the system. The system being accessed can be any type of system such as a host computer, a long distance telephone system, an ATM, a building, an automobile, or any other system. If the user is determined to be an imposter, the user can be denied access to the system.

Alternatively, instead of denying the user access to the system, it is possible to perform other steps. For example, if the user is determined to be an imposter, the user might be required to enter additional password type information. Alternatively, a system operator can be notified that a user has not passed the keystroke test and the system operator might verify that the person at the terminal is actually the authorized user by some other type of method. However, the invention is not limited to giving a specific response once the user is determined to be authorized or an imposter but is applicable to any type of response to the authorized user/imposter determination.

Once the neural network used to test whether a user is authorized or an imposter is trained or created, only the information pertaining to the characteristics of the neural network need be stored. For example, the neural network information (e.g. number of nodes and weights of connections), or information pertaining to the purified samples to be used by a distance analysis technique need be stored as a user profile, for example, on a magnetically encoded card much like the magnetic strip on many credit cards. The hardware device could read that profile, use it to analyze the typing input from the keyboard, and then send the resulting verdict to the host. This would allow added security: each user must have the appropriate card, then the user must be able to type in such a way as to match the profile on the card.

As the present invention is testing whether a user sample is authorized, the user's profile can be continuously updated. For example, each time a user typed in a new sample and it was authenticated, that sample could be used to further train the neural network using one or two iterations, for example. Alternatively, there could be some modification made to a vector used in the distance analysis technique based on the characteristics of the newly authorized user sample. This type of updating would have the effect of allowing a user's profile to continuously adapt to the changing typing styles of the user. As his typing improved or changed, the profile would change with him.

All known previous scholarly literature suggests that using text of 15–20 characters, such as a name and/or password would not provide enough information to authenticate or reject a user at any reasonable rate of accuracy. Because each keystroke or digraph (the relationship of two keystrokes) provides only a small amount of information, and if only 15–20 keystrokes were used, it was previously believed that there would not be enough information to make an accurate judgement as to the authenticity of the user. In fact, Leggett et al attributes his improved imposter pass rate and false alarm rate to using a 537 character text over a 300 character text. This suggests that the way to lower IPRs and FARs was to examine longer texts rather than shorter ones.

In contrast to these previously held conclusions, the present inventors have found that their invention is able to give IPRs and FARs significantly lower than those reported in literature using smaller typing samples. The unexpected results of the present invention are obtained using a shorter typing sample which is a factor of 25 less than previous research has used (from 500 characters down to 20 characters).

FIGS. 9a, 9b, and 10 illustrates the test results of two different test groups. The columns in the tables of FIGS. 9a, 9b and 10 contain the following information. The first column is the subject number which is an arbitrarily assigned number. The second column is the number of keystrokes typed by the user. The third column is the number of imposter and user training sets created for the subject. The fourth column is the number of imposter and user data sets which were tested for authenticity. The fifth column illustrates those imposter and user samples which were rejected before being analyzed by the distance, ADALINE or back propagation neural network approach. These were rejected on the basis of idiosyncratic use of shift keys or "Cap Lock" keys, or because the vector produced by the input had a different number of elements than those normally produced by the authorized user. The sixth column is the result of testing using the Euclidian distance method after a self-organizing network purifies the samples. The seventh column contains the results achieved by the ADALINE neural element after the purification of the samples by a self-organizing network. The eighth column illustrates the results achieved by a back propagation neural network after purification by the self-organizing network, and the last column illustrates the best results obtained by one of the three testing methods. Note that the data of FIG. 10 was not processed using a back propagation method.

The data of FIGS. 9a, 9b and 10 illustrate that there is no specific testing method which achieves the best results for every person. Therefore, for each person, it might be desired to perform testing using the Euclidian distance method, ADALINE neural element, a back propagation neural network, and/or some similar discrimination technique after purification to determine which testing method achieves the best results for a specific person and then use the best testing method when the system actually tests an input sample for that person. Note that it is possible to operate the invention without a purification step although less accurate determinations will probably result.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for verifying whether a user of a system is authorized using keystroke information, comprising the steps:

creating user training signals from keystroke characteristics of the user, each of said user training signals including a plurality of different portions constructed from keystrokes;

purifying said user training signals by determining variances of the portions of the user training signals, and discarding a same portion of each of said user training signals when the variance of said same portion is above a predetermined threshold;

inputting a signal to be tested containing keystroke data;

determining a similarity between the input signal to be tested and the purified user training signals; and allowing access to the system if said input signal to be tested and said purified user training signals are determined to have at least a predetermined threshold of similarity.

2. A method for verifying whether a user of a system is authorized using keystroke information according to claim 1, further comprising the step:

creating imposter training signals from a keystroke source; and wherein the purifying step examines both said imposter training signals and said user training signals to purify said user training signals.

3. A method for verifying whether a user of a system is authorized using keystroke information according to claim 2, wherein the purifying step uses a self-organizing neural network to group said imposter training signals and said user training signals into clusters having similar keystroke characteristics.

4. A method for verifying whether a user of a system is authorized using keystroke information according to claim 2, further comprising the step of:

training an ADALINE processing element using said purified signals and said imposter signals; and wherein said step of determining a similarity uses the trained ADALINE processing element to determine said similarity.

5. A method for verifying whether a user of a system is authorized using keystroke information according to claim 2, further comprising the step of:

training a back propagation neural network using said purified signals and said imposter signals; and wherein said step of determining a similarity uses the trained back propagation neural network to determine said similarity.

6. A method for verifying whether a user of a system is authorized using keystroke information according to claim 1, wherein the determining step uses a distance method to determine a distance between a vector representative of the signal to be tested and a vector representative of at least one user training signal and if said determined distance is less than a predetermined distance, allowing access to the system.

7. A method for verifying whether a user of a system is authorized using keystroke information according to claim 1, further comprising the step of:

determining time periods between keystrokes used to create said user training and input signals; and wherein each of said signals comprises information relating to said timing periods.

8. A method for verifying whether a user of a system is authorized using keystroke information according to claim 7, wherein each of said signals comprises digraph latency time information.

9. A method for verifying whether a user of a system is authorized using keystroke information according to claim 8, wherein each of said signals further comprises key hold time information.

10. A method for verifying whether a user of a system is authorized using keystroke information according to claim 1, further comprising the step:

prohibiting access to the system if said input signal to be tested and said purified user training signals are determined to have less than said predetermined threshold of similarity.

11. A method for verifying whether a user of a system is authorized using keystroke information according to claim 1, further comprising the step:

updating a profile of the purified user training signals by adjusting the profile using the input signal when the input signal is determined to have at least said predetermined threshold of similarity.

12. An apparatus for verifying whether a user of a system is authorized using keystroke information, comprising:

a keyboard;

means for creating user training samples from keystroke characteristics of the user, including at least one of a timer for determining timing characteristics of keystrokes and pressure sensors for detecting pressure characteristics of keystrokes, each of said user training samples including a plurality of different portions constructed from keystrokes;

means for purifying said user training samples by determining variances of the portions of the user training samples, and discarding a same portion of each of said user training samples when the variance of said same portion is above a predetermined threshold;

means for inputting a sample to be tested containing keystroke characteristics;

means for determining a similarity between the input sample to be tested and the purified user training samples; and means for allowing access to the system if said input sample to be tested and said purified user training samples are determined to have at least a predetermined threshold of similarity.

13. An apparatus for verifying whether a user of a system is authorized using keystroke information according to claim 12, further comprising:

means for creating imposter training samples from a keystroke source; and wherein the purifying means examines both said imposter training samples and said user training samples.

14. An apparatus for verifying whether a user of a system is authorized using keystroke information according to claim 13, wherein the purifying means comprises a self-organizing neural network for grouping said imposter training samples and said user training samples into clusters having similar keystroke characteristics.

15. An apparatus for verifying whether a user of a system is authorized using keystroke information according to claim 13, further comprising:
   means for training an ADALINE processing element using said purified samples and said imposter samples; and
   wherein said determining means uses the trained ADALINE processing element to determine said similarity.

16. An apparatus for verifying whether a user of a system is authorized using keystroke information according to claim 13, further comprising:
   means for training a back propagation neural network using said purified samples and said imposter samples; and
   wherein said determining means uses the trained back propagation neural network to determine said similarity.

17. An apparatus for verifying whether a user of a system is authorized using keystroke information according to claim 12, wherein the determining means uses a distance determining method to determine a distance between a vector representative of the sample to be tested and a vector representative of at least one user training sample and if said determined distance is less than a predetermined distance, allowing access to the system.

18. An apparatus for verifying whether a user of a system is authorized using keystroke information according to claim 12, wherein said means for creating user training samples create said user training samples to have digraph latency time information.

19. An apparatus for verifying whether a user of a system is authorized using keystroke information according to claim 18, wherein said means for creating user training samples creates said user training samples to have key hold time information.

20. An apparatus for verifying whether a user of a system is authorized using keystroke information according to claim 12, further comprising:
   means for prohibiting access to the system if said input sample to be tested and said purified user training samples are determined to have less than said predetermined threshold of similarity.

21. An apparatus for verifying whether a user of a system is authorized using keystroke information according to claim 12, further comprising:
   means for updating a profile of the purified user training samples by adjusting the profile using the input sample when the input sample is determined to have at least said predetermined threshold of similarity.

22. A method for verifying whether a user of a system is authorized using keystroke information, comprising the steps:
   creating user training signals from keystroke characteristics of the user, each of said user training signals including a plurality of different portions constructed from keystrokes;
   creating imposter training signals from a keystroke source;
   purifying said user training signals by determining variances of the portions of the user training signals, and discarding a same portion of each of said user training signals when the variance of said same portion is above a predetermined threshold;
   training an ADALINE processing element using said user training signals and said imposter training signals;
   inputting a signal to be tested contain keystroke data;
   determining a similarity between the input signal to be tested and the purified user training signals using said trained ADALINE processing element; and
   allowing access to the system if said input signal to be tested and said purified user training signals are determined to have at least a predetermined threshold of similarity using said trained ADALINE processing element.

23. A method for verifying whether a user of a system is authorized using keystroke information according to claim 22, wherein the purifying step uses a self-organizing neural network to group said imposter training signals and said user training signals into clusters having similar keystroke characteristics.

24. A method for verifying whether a user of a system is authorized using keystroke information according to claim 22, wherein the purifying step performs a statistical analysis to eliminate at least one user training signal which is statistically different from other user training signals.

25. A method for verifying whether a user of a system is authorized using keystroke information according to claim 22, further comprising the step of:
   determining time periods between keystrokes used to create said signals; and
   wherein each of said signals comprises information relating to said time signals.

26. A method for verifying whether a user of a system is authorized using keystroke information according to claim 22, wherein each of said signals comprises digraph latency time information.

27. A method for verifying whether a user of a system is authorized using keystroke information according to claim 26, wherein each of said signals further comprises key hold time information.

28. A method for verifying whether a user of a system is authorized using keystroke information according to claim 22, further comprising the step:
   prohibiting access to the system if said input signal to be tested and said purified user training signals are determined to have less than said predetermined threshold of similarity.

29. A method for verifying whether a user of a system is authorized using keystroke information according to claim 22, further comprising the step:
   updating a profile of the purified user training signals by adjusting the profile using the input signal when the input signal is determined to have at least said predetermined threshold of similarity.

30. An apparatus for verifying whether a user of a system is authorized using keystroke information, comprising:
   a keyboard;
   means for creating user training samples from keystroke characteristics of the user, including at least one of a timer for determining timing characteristics of keystrokes, pressure sensors for detecting pressure characteristics of keystrokes, and accelerometers for detecting acceleration characteristics of keystrokes, each of said user training samples including a plurality of different portions constructed from keystrokes;

means for creating imposter training samples from a keystroke source;

means for purifying said user training samples by determining variances of the portions of the user training samples, and discarding a same portion of each of said user training samples when the variance of said same portion is above a predetermined threshold;

means for training an ADALINE processing element using said user training samples and said imposter training samples;

means for inputting a sample to be tested containing keystroke characteristics;

means for determining a similarity between the input sample to be tested and the purified user training samples, said means for determining including said trained ADALINE processing element; and means for allowing access to the system if said input sample to be tested and said purified user training samples are determined to have at least a predetermined threshold of similarity by said means for determining including said trained ADALINE processing element.

31. An apparatus for verifying whether a user of a system is authorized using keystroke information according to claim 30, wherein the purifying means comprises a self-organizing neural network for grouping said imposter training samples and said user training samples into clusters having similar keystroke characteristics.

32. An apparatus for verifying whether a user of a system is authorized using keystroke information according to claim 30, wherein the purifying means performs a statistical analysis to eliminate at least one user training sample which is statistically different from other user training samples.

33. An apparatus for verifying whether a user of a system is authorized using keystroke information according to claim 30, wherein said means for creating user training samples creates said user training samples to have digraph latency time information.

34. An apparatus for verifying whether a user of a system is authorized using keystroke information according to claim 33, wherein said means for creating user training samples creates said user training samples to further have key hold time information.

35. An apparatus for verifying whether a user of a system is authorized using keystroke information according to claim 30, further comprising:

means for prohibiting access to the system if said input sample to be tested and said purified user training samples are determined to have less than said predetermined threshold of similarity.

36. An apparatus for verifying whether a user of a system is authorized using keystroke information according to claim 30, further comprising:

means for updating a profile of the purified user training samples by adjusting the profile using the input sample when the input sample is determined to have at least said predetermined threshold of similarity.

37. A method for verifying whether a user of a system is authorized using keystroke information, comprising the steps:

creating user training signals from keystroke characteristics of the user, each of said user training signals including a plurality of different portions constructed from keystrokes;

creating imposter training signals from a keystroke source;

purifying said user training signals by determining variances of the portions of the user training signals, and discarding a same portion of each of said user training signals when the variance of said same portion is above a predetermined threshold;

training a back propagation neural network using said user training signals and said imposter training signals;

inputting a signal to be tested containing keystroke characteristics;

determining a similarity between the input signal to be tested and the purified user training signals using said trained back propagation neural network; and allowing access to the system if said input signal to be tested and said purified user training signals are determined to have at least a predetermined threshold of similarity using said trained back propagation neural network.

38. A method for verifying whether a user of a system is authorized using keystroke information according to claim 37, wherein the purifying step uses a self-organizing neural network to group said imposter training signals and said user training signals into clusters having similar keystroke characteristics.

39. A method for verifying whether a user of a system is authorized using keystroke information according to claim 37, wherein the purifying step performs a statistical analysis to eliminate at least one user training signal which is statistically different from other user training signals.

40. A method for verifying whether a user of a system is authorized using keystroke information according to claim 37, further comprising the step of:

determining time periods between keystrokes used to create said signals; and wherein each of said signals comprises information relating to said time periods.

41. A method for verifying whether a user of a system is authorized using keystroke information according to claim 40, wherein each of said signals comprises digraph latency time information.

42. A method for verifying whether a user of a system is authorized using keystroke information according to claim 41, wherein each of said signals further comprises key hold time information.

43. A method for verifying whether a user of a system is authorized using keystroke information according to claim 37, further comprising the step:

prohibiting access to the system if said input signal to be tested and said purified user training signals are determined to have less than said predetermined threshold of similarity.

44. A method for verifying whether a user of a system is authorized using keystroke information according to claim 37, further comprising the step:

updating a profile of the purified user training signals by adjusting the profile using the input signal when the input signal is determined to have at least said predetermined threshold of similarity.

45. An apparatus for verifying whether a user of a system is authorized using keystroke information, comprising:

a keyboard;

means for creating user training samples from keystroke characteristics of the user including at least one of a timer for determining timing characteristics of keystrokes and pressure sensors for detecting pressure characteristics of keystrokes, each of said user training samples including a plurality of different portions constructed from keystrokes;

means for creating imposter training samples from a keystroke source;

means for purifying said user training samples by determining variances of the portions of the user training samples, and discarding a same portion of each of said user training samples when the variance of said same portion is above a predetermined threshold;

means for training a back propagation neural network using said user training samples and said imposter training samples;

means for inputting a sample to be tested containing keystroke characteristics;

means for determining a similarity between the input sample to be tested and the purified user training samples, said means for determining including said trained back propagation neural network; and means for allowing access to the system if said input sample to be tested and said purified user training samples are determined to have at least a predetermined threshold of similarity by said means for determining including said trained back propagation neural network.

46. An apparatus for verifying whether a user of a system is authorized using keystroke information according to claim 45, wherein the purifying means comprises a self-organizing neural network for grouping said imposter training samples and said user training samples into clusters having similar keystroke characteristics.

47. An apparatus for verifying whether a user of a system is authorized using keystroke information according to claim 45, wherein the purifying means performs a statistical analysis to eliminate at least one user training sample which is statistically different from other user training samples.

48. An apparatus for verifying whether a user of a system is authorized using keystroke information according to claim 45, wherein said means for creating user training samples creates said user training samples to have digraph latency time information.

49. An apparatus for verifying whether a user of a system is authorized using keystroke information according to claim 48, wherein said means for creating user training samples creates said user training samples to further have key hold time information.

50. An apparatus for verifying whether a user of a system is authorized using keystroke information according to claim 45, further comprising:

means for prohibiting access to the system if said input sample to be tested and said purified user training samples are determined to have less than said predetermined threshold of similarity.

51. An apparatus for verifying whether a user of a system is authorized using keystroke information according to claim 45, further comprising:

means for updating a profile of the purified user training samples by adjusting the profile using the input sample when the input sample is determined to have at least said predetermined threshold of similarity.

* * * * *